United States Patent [19]
Elder

[11] Patent Number: 5,465,905
[45] Date of Patent: Nov. 14, 1995

[54] IRRIGATION SYSTEM WITH MULTI-FUNCTIONAL IRRIGATION CONTROL VALVES

[75] Inventor: Jack E. Elder, Rochester, Mich.

[73] Assignee: Mister Dripper Company, LLC, Richmond, Ind.

[21] Appl. No.: 214,813

[22] Filed: Mar. 17, 1994

[51] Int. Cl.$^6$ .............................. B05B 1/08; B05B 1/12; B05B 1/16
[52] U.S. Cl. ..................... 239/75; 239/99; 239/533.1; 239/533.15; 239/542; 239/444; 239/446; 137/510
[58] Field of Search ................... 239/98, 101, 533.1, 239/533.15, 75, 436, 443, 444, 446, 542; 251/45, 75, 61.2, 61.3; 137/510

[56] References Cited

U.S. PATENT DOCUMENTS

| | | | |
|---|---|---|---|
| Re. 29,155 | 3/1977 | Mears et al. | 239/75 X |
| 1,783,646 | 12/1930 | Hajek | 137/510 |
| 1,984,531 | 12/1934 | Kind et al. | 239/99 |
| 2,902,048 | 9/1959 | Ryan, Jr. | 137/510 |
| 3,053,461 | 9/1962 | Inglis | 239/99 X |
| 3,155,366 | 11/1964 | Rasmussen | 137/510 X |
| 3,321,138 | 5/1967 | Curry | 239/101 X |
| 3,841,558 | 10/1974 | Fowler et al. | |
| 3,856,206 | 12/1974 | Bell et al. | 239/75 |
| 3,915,384 | 10/1975 | Diggs | |
| 4,177,947 | 12/1979 | Menzel | 239/542 |
| 4,344,576 | 8/1982 | Smith | 239/542 |
| 4,405,084 | 9/1983 | Georgiev et al. | 239/101 X |
| 4,512,514 | 4/1985 | Elcott | 239/99 |
| 4,643,355 | 2/1987 | Sanders et al. | |
| 4,838,485 | 6/1989 | Rinkewich | 239/99 X |
| 4,846,406 | 7/1989 | Christy | |
| 4,863,101 | 9/1989 | Pater et al. | 239/99 |
| 4,869,432 | 9/1989 | Christy | |
| 4,909,441 | 3/1990 | Christy | |
| 4,955,539 | 9/1990 | Ruttenberg | 239/99 X |
| 4,998,558 | 3/1991 | Solomon | 137/510 |
| 5,249,745 | 10/1993 | Bertolotti | 239/101 X |
| 5,314,116 | 5/1994 | Krauth et al. | 239/99 |

FOREIGN PATENT DOCUMENTS

| | | | |
|---|---|---|---|
| 1482613 | 5/1989 | U.S.S.R. | 239/101 |

OTHER PUBLICATIONS

Wade Rain Publication Entitled "Pulsator", Feb. 1993.

*Primary Examiner*—William Grant
*Attorney, Agent, or Firm*—Harness, Dickey & Pierce

[57] ABSTRACT

The present invention provides an irrigation control valve for use in an irrigation system having a liquid supply tube providing liquid to be emitted from the irrigation control valve. The irrigation control valve includes a control valve body having an inlet coupled to the liquid supply tube, a drip port for providing drip irrigation from the irrigation control valve and a mist port for providing mist irrigation from the irrigation control valve. The irrigation control valve further includes a displaceable structure disposed within the control valve body for directing liquid to the drip port or the mist port in response to a control signal.

33 Claims, 6 Drawing Sheets

IRRIGATION SYSTEM WITH MULTI-FUNCTIONAL IRRIGATION CONTROL VALVES

BACKGROUND OF THE INVENTION

1. Field of the Invention

The present invention relates to an irrigation control valve and an irrigation system having a liquid supply tube and a plurality of identical irrigation control valves, for selectively providing drip irrigation or mist irrigation in response to a control signal, and more particularly to an irrigation system having a liquid supply tube and an irrigation control valve having a valve body including an inlet port coupled to the liquid supply tube, a drip port, a mist port and a displaceable structure disposed therein, the displaceable structure being responsive to a fluid pressure for selectively directing liquid to the drip port or to the mist port.

2. Description of Related Art

In order to achieve maximum crop yield, careful monitoring and control of the growing environment must occur. For example, agricultural irrigation is used to temper climate conditions which are adverse to crop production, including watering the soil, protecting crops from frost damage, preventing the growth of mold and fungus, and applying chemicals, insecticides, pesticides and fertilizers to promote growth. These techniques are also used in animal husbandry to cool animals, such as livestock, and to provide pest control.

A variety of individual systems which provide localized climate control are known. For example, crops may be watered through surface, subsurface, sprinkler and drip irrigation systems. Surface, subsurface and sprinkler irrigation systems are inefficient means of watering since they provide moisture to the crops by irrigating the entire field area. Large quantities of water which are transported to and around the fields do not irrigate the crop directly but rather wet the entire field. A great deal of water and energy used to transport the water is wasted as a result of evaporation to the atmosphere or absorption into the soil. Thus, only a small portion of the water is actually utilized by the crop. Furthermore, the large pipelines and pumps needed to transport the vast quantities of water are expensive to purchase, construct and maintain.

Drip irrigation provides a method of continuously irrigating individual plants through small-diameter tubes and emitters. The advantage of drip systems is that water can be targeted directly at the crop to create localized high moisture areas without having to irrigate the remaining field area. The components of a drip irrigation system are much less expensive than surface, subsurface or sprinkler-type systems. As a result, drip irrigation systems are fairly common and, once installed, are efficient and fairly maintenance free. In addition, they currently are not integrated with other climate control systems. Thus, a drip irrigation system by itself may be improved in efficiency by incorporating additional functionality.

A single frost during a growing season can severely decrease or destroy crop production and yield for an entire season. Thus, frost damage protection which can be achieved through the use of smudge pots, tower fans, helicopters, sprinklers or mist irrigation is essential to ensure crop production. A smudge pot is basically a stove located in the field which burns fuel to warm the air at ground level around the crops. Numerous smudge pots are needed to warm an entire field. They are labor, fuel and maintenance intensive. The fuels may be petroleum-based which if spilled can kill the crops and pollute the environment. In addition, the combustion byproducts of the fuel create unwanted air pollution. Similarly, tower fans and helicopters are used provide air circulation around the crops thereby mixing the warmer air from above with the cooler air near the ground. Often smudge pots are used in combination with these systems to provide additional heating. But these systems are inefficient since they work globally on the fields and not locally on the crops. In addition, the capital investment for the equipment is very high.

Sprinkler systems may be used to provide frost protection for the crops, as well as for watering, since water releases heat as it freezes. The crops are watered when the temperature approaches freezing to coat the plants. The latent heat of fusion necessary to freeze water guarantees that the tissue temperatures will not drop below freezing as long as water is present on the plant. However, large quantities of water are required for this type of frost protection, and ice which accumulate on the crop may cause limb breakage. Mist irrigation, which locally increases the humidity around the corp, is another means for providing frost protection. Much like the sprinkler system, the mist irrigation system coats the plants with water to protect them from frost damage. However, by targeting water in a mist directly at the crop, much less water is need to coat the plant which reduces the amount of ice accumulation. In addition, mist irrigation also provides frost protection by transferring energy from the misted water to the air surrounding the crops. The current sprinkler and mist irrigation systems which provide frost protection cannot be targeted directly at the crops. Accordingly, excessive amounts of water or mist must be provided to ensure adequate frost damage protection.

Agricultural needs also require control over the application of chemical insecticides, pesticides, fungicides and fertilizers. Current methods of application require additional systems, such as tractor-mounted spraying mechanism or aircraft-mounted crop dusting equipment. These systems are extremely expensive to purchase and operate. In addition, they are inefficient and polluting since they result in significant overspray of the chemical into the environment surrounding the crops.

Each of the systems identified above must be individually installed, operated and periodically maintained. Thus, they are costly to purchase and operate. Accordingly, there is a need to provide an irrigation system that will perform the necessary climate control tasks of watering and fertilizing through drip irrigation, as well as, frost protection and pest control through mist irrigation. A combination drip/mist irrigation system would provide an economical system for adequately irrigating crops by reducing and conserving the water used. The system components should be simple in design, low in cost to purchase and maintain and readily adaptable to a variety of agricultural environments, including fields, orchards, greenhouses, atriums, livestock barns, etc. The individual irrigation control valves should be easy to install and appropriately align so that irrigation is targeted at the desired location. Furthermore, the irrigation system should be compatible with current irrigation technology so that it may be retrofitted into existing irrigation systems.

3. Objects of the Present Invention

It is one of the principal objects of the present invention to provide a novel irrigation control valve and irrigation system having a liquid supply tube which selectively provides drip irrigation or mist irrigation for watering, frost protection and fertilizing of crops.

Another object of the present invention is to provide an irrigation control valve whose mode of operation is controlled in response to a control signal.

A further object of the present invention is to provide an irrigation control valve which can be readily adapted to current irrigation systems for alternately providing drip irrigation and mist irrigation.

It is another object of the present invention to provide an irrigation control valve for an irrigation system capable of effectively delivering mist irrigation while reducing the total volume of water emitted.

An additional object of the present invention is to provide an easily-installed self-aligning support bracket for an irrigation control valve such that the drip irrigation is directed substantially downward and the mist irrigation is directed substantially upward.

Still another object of the invention is to provide an automated irrigation control system which monitors the environment and provides drip irrigation, mist irrigation or air circulation for providing a preferred growing environment for agriculture.

SUMMARY OF THE INVENTION

To achieve the foregoing and other objects, there is provided in accordance with the present invention, an irrigation control valve for use in an irrigation system having a liquid supply tube providing liquid to be emitted from the irrigation control valve. The irrigation control valve includes a control valve body having an inlet coupled to the liquid supply tube and a drip port for providing drip irrigation from the irrigation control valve to water the crop and a mist port for providing mist irrigation from the irrigation control valve to provide frost protection and evaporative cooling. The irrigation control valve further includes a displaceable structure disposed within the control valve body for directing liquid to the drip port or the mist port in response to a control signal.

In one preferred embodiment, the irrigation control valve is responsive to the pressure in the liquid supply tube, such that drip irrigation is provided when the pressure in the liquid supply tube is in a low pressure state and mist irrigation is provided when the pressure in the liquid supply tube is in a high pressure state. The displaceable structure in this preferred embodiment is a dual piston assembly which reciprocates within the irrigation control valve to alternately reveal and conceal the drip port and the mist port in response to the pressure in the liquid supply tube. An air supply tube, providing a volumetric flow of air, can be coupled to the irrigation control valve of this preferred embodiment to facilitate the atomization of liquid emitted from the mist port.

In another preferred embodiment, the irrigation system includes a liquid supply tube and an air supply tube, each providing a volumetric flow of their respective fluids at a given pressure. In this embodiment, the irrigation control valve is responsive to the pressure in the air supply tube, such that drip irrigation is provided when the pressure in the air supply tube is in an atmospheric pressure state and mist irrigation is provided when the pressure in the air supply tube is in a high pressure state. The displaceable structure in this preferred embodiment is a single piston assembly which reciprocates within the irrigation control valve to alternately reveal and conceal the drip port and the mist port in response to the pressure in the air supply tube. Further, the volumetric flow of air can be utilized to facilitate the atomization of the liquid emitted from the mist port.

In an additional preferred embodiment, the irrigation control valve is responsive to a pressure signal provided by a separate control fluid tube which does not require a volumetric flow the control fluid. In this preferred embodiment drip irrigation is provided when the pressure in the control fluid tube is in a low pressure state and mist irrigation is provided when the pressure in the control fluid tube is in a high pressure state. The displaceable structure in this preferred embodiment is a piston-diaphragm assembly which displaces within the irrigation control valve. The piston-diaphragm assembly is biased so that the drip port is revealed and the mist port is concealed when the control pressure is in a low pressure state thus allowing drip irrigation. When a high pressure is applied in the control fluid tube, the piston-diaphragm assembly displaces to conceal the drip port and reveal the mist port thus allowing mist irrigation from the irrigation control valve. Additionally, a pressure wave can be input through the control line to provide pulsed mist irrigation.

In another preferred embodiment, the irrigation control valve is responsive to the pressure signal provided by a separate control fluid tube which does not require a volumetric flow the control fluid. In this preferred embodiment the displaceable structure is a diaphragm valve member which reveal and conceal the drip port. In this preferred embodiment, a second valve assembly is interdisposed between the irrigation control valve and the mist port to provide intermittent or pulsating mist irrigation. The second valve assembly acts as a pressure relief mechanism for alternately revealing and concealing the mist port in response to the fluid pressure the irrigation control valve during mist irrigation.

The present invention also provides a self-aligning support bracket for appropriately aligning and fixturing irrigation control valves. The support bracket is intended to mount on a vertical post, such as a 2×2, metal stake or any other suitable post, and locate the irrigation control valves above ground level so that cultivation of the soil can be performed but below the foliage level so that drip irrigation reaches the ground unhindered. The support bracket further includes a tube retaining means for holding the supply tube and an irrigation control valve alignment means for appropriately aligning the irrigation control valve so that drip irrigation is emitted in a substantially downward direction and mist irrigation is targeted upward at the crop, such as a vine, for optimal frost damage protection.

BRIEF DESCRIPTION OF THE DRAWINGS

In order to appreciate the manner in which the above-recited and other advantages and objects of the invention are obtained, a more particular description of the invention will be rendered by reference to specific embodiments thereof which are illustrated in the appended drawings. Understanding that these drawings depict only a typical embodiment of the invention and are not therefore to be considered limiting of its scope, the invention will be described and explained with additional specificity and detail through the use of the accompanying drawings in which:

FIG. 1 is a perspective of an irrigation system having a plurality of irrigation control valves with a water supply tube for alternately providing drip irrigation or mist irrigation in response to water supply pressure in an orchard environment;

FIG. 2 is a cross-section of a first preferred embodiment of the irrigation control valve shown in FIG. 1 wherein the displaceable structure includes dual reciprocating pistons disposed within the control valve body.

DESCRIPTION OF THE PREFERRED EMBODIMENT

Figure 1:
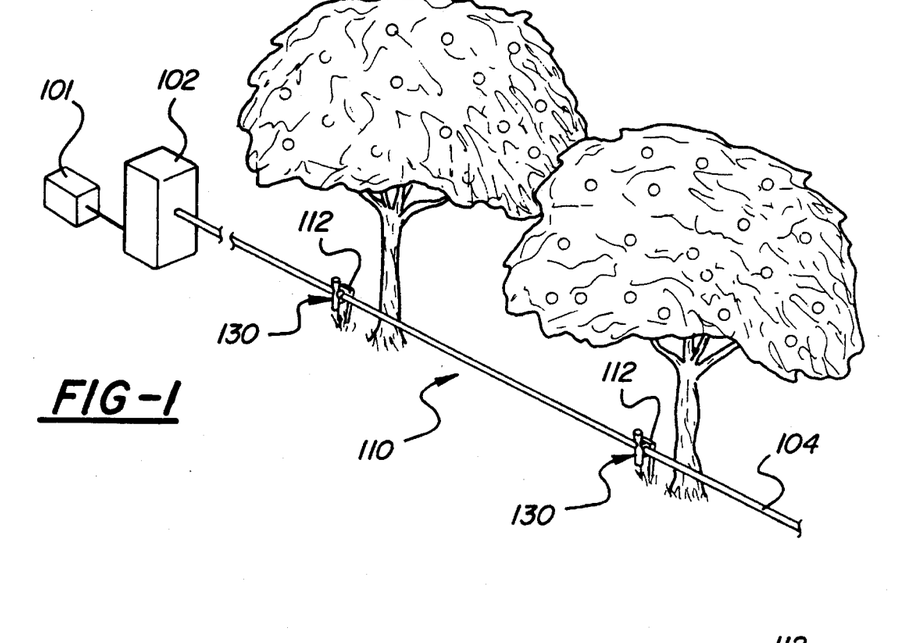

FIG. 1 illustrates a first embodiment of the present invention having a dual reciprocating piston assembly for selectively providing drip and mist irrigation in an agricultural environment. Irrigation system 110 includes irrigation control valve 130 mounted on support post 112. Water supply 102 supplies a volumetric flow of water to water supply tube 104 at a given pressure. A plurality of irrigation control valves 130 are selectively positioned along water supply tube 104 to provide irrigation for crop C illustrated in FIG. 1 as fruit trees.

Individual irrigation control valves 130 are snapped into holes punctured in water supply tube 104 using a piercing tool or other similar device. Irrigation control valve 130 couples with water supply tube 104 to provide a water tight seal. When irrigation control valve 130 is removed, a snap cap (not shown) may be inserted into the existing hole to seal water supply tube 104 and prevent leakage. In this manner irrigation system 110 may be used for many years and adapted to varying planting needs.

Water supply 102 is a well/pump combination or any other similar means of providing a water source. Furthermore, water supply 102 incorporates a means for regulating the pressure of the water into water supply tube 104 such as a pressure control valve. An automated controller 101 may also be incorporated into irrigation system 110 to filter, measure and calculate application of water and/or other fluids such as chemicals for fertilization and pest control. Controller 101 may be operated manually or assisted by meteorological, soil quality or Ph measuring instrumentation. Controller 101 may also operate a single irrigation system 110 or multiple irrigation systems using shutoff valves and manifolds coupled to the water supply tubes. These manifolds and shutoff valves may be customized to adapt for varying central water pressure. In this regard, the present invention is such that it can be readily adapted to a standard drip irrigation system currently available and well-known in the art.

Figures 2, 2A:
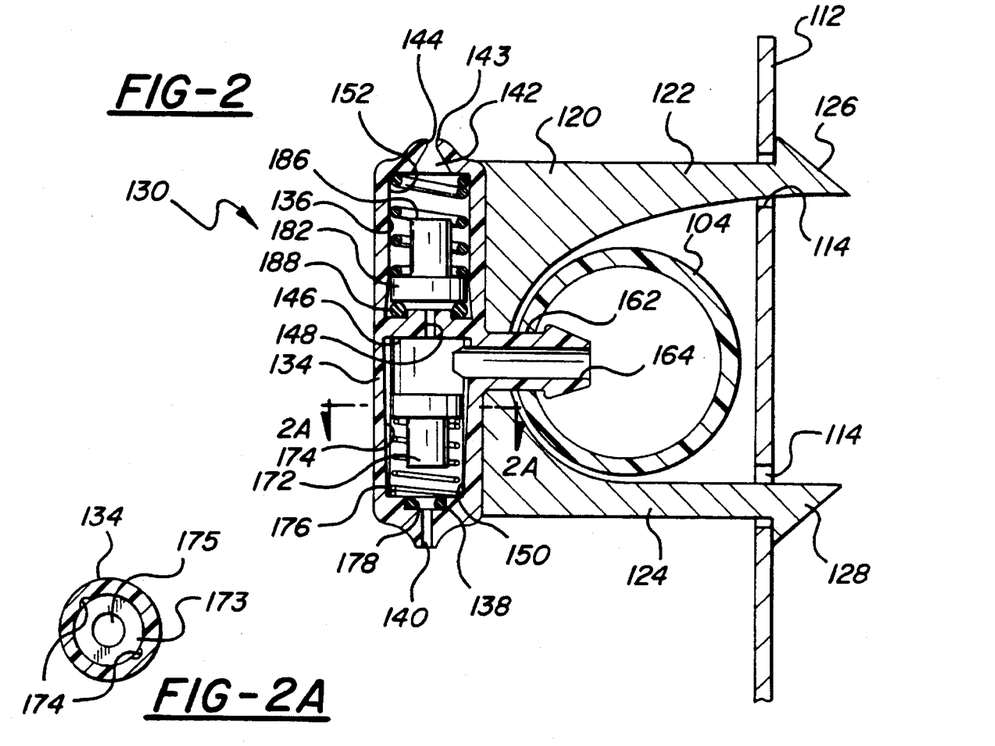
FIG. 2A is a cross section of a piston head for irrigation control valve shown in FIGS. 2 & 5.

Referring to FIG. 2, irrigation control valve 130 includes control valve body 132 having an inlet passageway 164, a drip port 140 and mist port 144. Water supply tube 104 is coupled to irrigation control valve 130 via inlet passageway 164 to provide fluid communication therebetween. Orientation fin 120 extending from control valve body 132 surrounds the outer circumference of water supply tube 104 and attaches to support post 112 to locate and appropriately position irrigation system 110 relative to crop C. Orientation fin 120 includes upper finger 122 and lower finger 124 extending therefrom to surround water supply tube 104. Support post 112 includes slot 114 for engaging upper and lower fingers 122 and 124. Barb 126 and 128 extend from upper and lower finger 122 and 124 respectively, to engage support post 112, thereby preventing dislocation of the irrigation control valve 130 from support post 112. Support post 112 locates water supply tube 104 above ground level so that the soil may be cultivated and below the foliage level of crop C so that drip irrigation water reaches the ground unhindered.

Control valve body 132 includes cylindrical housing 134 which has bore 136 extending down through the longitudinal axis thereof. End cap 138 is positioned at the bottom of, and closes off cylindrical housing 134. Drip port 140 extends through end cap 138. Similarly, end cap 142 is located at the top of, and closes off cylindrical housing 134. Mist port 144 extends through end cap 142 which is tapered upwardly to form converging nozzle 143 from bore 136 to mist port 144. Interior wall 146 is disposed within bore 136 of cylindrical housing 134 and partitions bore 136 into lower chamber 150 and upper chamber 152. Port 148 extends through interior wall 146 along the central longitudinal axis of cylindrical housing 134 to provide fluid communication between lower chamber 150 and upper chamber 152. Nipple 162, disposed between cylindrical housing 134 and water supply tube 104, has inlet passageway 164 extending therethrough to provide fluid communication between water supply tube 104 and lower chamber 150.

In the embodiment shown in FIG. 2, the displaceable structure of irrigation control valve 130 includes drip piston assembly 170 and mist piston assembly 180 which directs water flow to either the mist port 144 or drip port 140 in response to the fluid pressure in water supply tube 104. Drip piston assembly 170, disposed within lower chamber 150, includes piston 172 capable of reciprocating along the longitudinal axis of cylindrical housing 134, spring 176 upwardly biasing piston 172 in lower chamber 150 and seal 178 adjacent to end cap 138 and circumscribing drip port 140. Spring 176 is disposed between end cap 138 and piston 172 and urges the piston away from seal 178, thereby creating a normally open valve, i.e. when fluid pressure is below a target pressure, fluid flow is allowed to occur through drip piston assembly 170.

Mist piston assembly 180, disposed within upper chamber 152, includes piston 182 which is capable of reciprocating along the longitudinal axis of upper chamber 152, spring 186 disposed between end cap 142 and piston 182 downwardly biasing piston 182, seal 188 located within upper chamber 152 adjacent to interior wall 146 and circumscribing port 148. Spring 186 is disposed between end cap 142 and piston 182 causing piston 182 to be urged against and engage seal 188, thus creating a normally closed valve. When the fluid pressure is below the mist activation pressure, mist piston assembly 180 prevents fluid flow through upper chamber 152 and out of mist port 144.

Referring to FIG. 2A, piston 172 includes piston head 173 having a diameter slightly less than bore 136 to enable pistons 172 to reciprocate therein and piston body 175 having an outer diameter slightly less than the interior diameter of spring 176 such that piston body 175 fits within spring 176. Bore 136 contains grooves 174 and 184 molded in lower chamber 150 and upper chamber 152, respectively. Grooves 174 and 184 are tapered towards drip port 140 and mist port 144 to provide flow regulation as pistons 172 and 182 reciprocate in bore 136.

Control valve body 132 may be manufactured as two thermoplastic injection molded body halves. The drip piston assembly 170 and mist piston assembly 180 may be manufactured as single elastomeric injection molded pistons. The piston may be molded of a flexible material, i.e. thermoplastic elastomer, TPO or an equivalent plastic such that piston 172 and 182 will change shape in certain desired areas with varying water pressure and also provide adequate seal against the end caps making seals 178 and 188 redundant and thus unnecessary. Pistons 172 and 182 may also be molded by a process which allows materials having different properties, i.e. modulus and durometer, to be molded together as one piece to attain the desired functionality. The various ports and passageways may be machined in a second manufacturing process or may be integrally molded precision ports and passageways. Piston assemblies 170 and 180 are sealed inside the control valve body 132 by a vibration welding, spin welding or adhesive bonding to form irrigation control valve 130.

The operation of the irrigation control valve 130 will now be described with particular reference to the structures described above. Water is pumped from water supply 102 through water supply tube 104 at a given pressure into lower chamber 150 of irrigation control valve 130 via inlet passageway 164. As water accumulates in the upper portion of lower chamber 150 it flows through groove 174 into the lower portion of lower chamber 150 and is emitted out drip port 140. The water pressure in lower chamber 150 acts on piston head 173 to generate a downward force causing piston 172 to be displaced downward towards end cap 138. This is reacted by the upward biasing force imposed on piston 172 by spring 176. As the fluid pressure in water supply tube 104 and lower chamber 150 increase, spring 176 is further compressed by piston 172 until spring 176 is fully compressed and piston body 175 engages seal 178. At this point piston body 175 and seal 178 cooperate to effectively seal lower chamber 150 from drip port 140 and prevent fluid communication therethrough.

Water within lower chamber 150 is also communicated into port 148. Seal 188 cooperates with piston head 183 to prevent fluid from flowing into upper chamber 152 and out through mist port 144. The preload in spring 186 is sufficient to urge piston 182 onto seal 188 when the fluid pressure is below the desired mist activation pressure. Once the water pressure in port 148 exceeds this pressure, the force acting on piston body 185 is sufficient to overcome the preload of spring 186 and disengage piston 182 from seal 188. This displacement provides fluid communication into upper chamber 152 and reveals groove 184 to enable fluid flow out of mist port 144. The velocity of the water flowing out of upper chamber 152 increases as it flows through converging nozzle 143 causing the water to be emitted as a fine mist or spray, i.e., vaporized through mist port 144. The nozzle geometry of converging nozzle 143 and mist port 144 has direct impact on the shape, direction and quality (droplet size) of the spray pattern. This geometry can be designed for specific targeting of crops for various applications based on requirements.

An exemplary mode of operation would be allow drip irrigation in a water pressure range from 0 to 20 pounds per square inch (p.s.i.). Thus, the spring constant for spring 176 should be computed such that the force created by 20 p.s.i. acting on piston head 173 is sufficient to fully compress spring 176. Mist irrigation would be provided when the fluid pressure in water supply tube 104 is greater than 40 p.s.i. To ensure control over the method of water delivery, there is a relative safety zone from 20 to 40 p.s.i. where neither drip irrigation or mist irrigation occurs. While these numbers are exemplary of typical field pressure, one skilled in the art would readily recognize that it is the relative pressure ranges and not the absolute pressure valves which are most important to the proper selection of drip and mist irrigation.

Figures 3, 4:
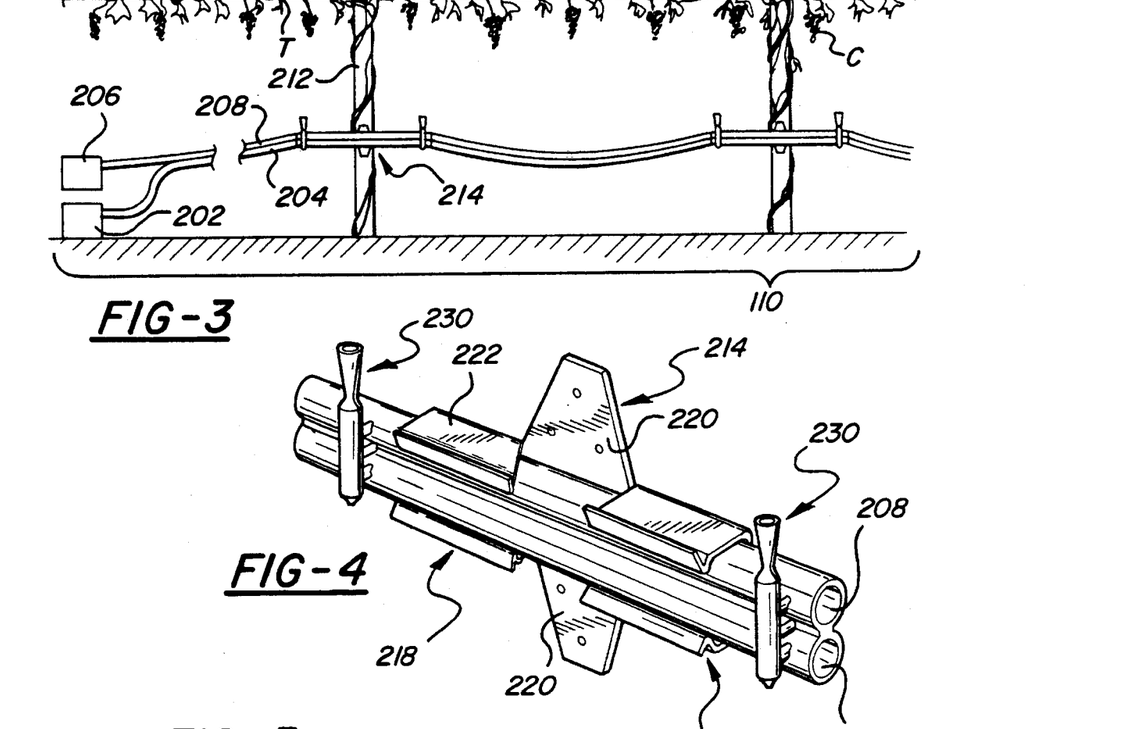
FIG. 3 is an elevation of an irrigation system having a plurality of irrigation control valves with water and air supply tubes for alternately providing drip irrigation or mist irrigation in response to water supply pressure in a viticultural environment, the irrigation control valves having air assist to facilitate the atomization of water during mist irrigation.
FIG. 4 is a perspective of a bracket for retaining the irrigation lines and appropriately positioning and targeting the irrigation control valve shown in FIG. 3.

FIG. 3 illustrates a second preferred embodiment of the present invention in a viticultural environment. Like reference numerals in the two hundred range are employed to indicate corresponding parts referenced in FIGS. 1 and 2. Irrigation system 210 includes irrigation control valves 230 coupled with water supply tube 204 and air supply tube 208. Water supply 202 supplies a volumetric flow to water to water supply tube 204 at a given pressure, while air supply tube 206 supplies a volumetric flow of air to air supply tube 208 at a given pressure. Irrigation system 210 is positively positioned within support bracket 214 which is attached to post 212 of trellis T. Crop C is trained to grow along trellis T such that irrigation system 210 may provide drip irrigation downward to the roots of crop C or mist irrigation upward towards the branches and buds of crop C.

Figure 5:
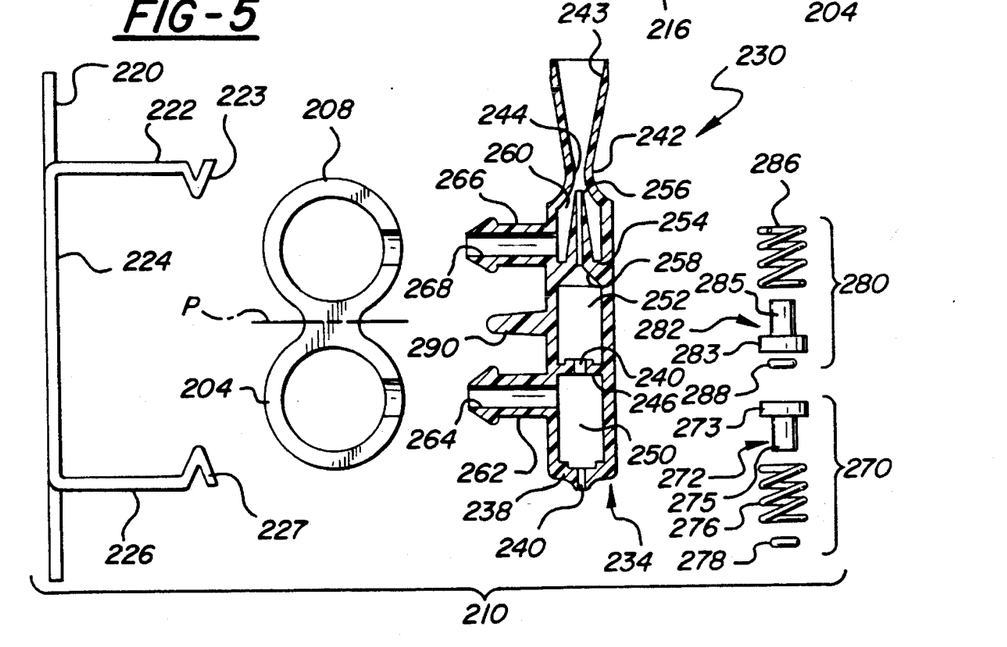
FIG. 5 is an exploded cross section of a second preferred embodiment of the irrigation control valve and support bracket shown in FIG. 4 wherein the displaceable structure is a dual reciprocating piston.

Referring to FIGS. 4 and 5, support bracket 214 is shown in greater detail and includes a right retaining means 216 and left retaining means 218 separated by an attachment flange 220. The right and left retaining means 216, 218 are substantially similar in cross-section and include top portion 222, back portion 224 and bottom portion 226 which forms a C-shaped channel for capturing water supply tube 204 and air supply tube 208. Edge 223 of top 222 and edge 227 of bottom 226 have a generally V-shaped cross-section for securing water supply tube 204 and air supply tube 208 within channels 216, 218. Irrigation control valve 230 can be located along support bracket 214 and coupled to water supply tubes 204 and air supply tube 208. Orientation prong 290 extends from cylindrical housing 234 and cooperates with supply tubes 204 and 208 to appropriately align irrigation control valve 230. In addition, retaining means 216, 218 can be employed engaged and appropriately align irrigation control valve 230. Flange 220 extends from back 224 of bracket 214. This flange may be cut out of a section of top 222 and bottom 226 and formed parallel to back 224. While flange 220 is provided with holes for attaching support bracket 214 to post 212, other means of attachment may be used. When irrigation system 210 including irrigation control valve 230 coupled to supply tubes 204 and 208 is placed in support bracket 214, irrigation control valves 230 are appropriately aligned to allow drip irrigation downward and mist irrigation upward.

Water supply tube 204 and air supply tube 208, as illustrated in FIGS. 3–5, are manufactured as a single component having water supply tube 204 and an air supply tube 208 formed therein. As shown in FIG. 5, water supply tube 204 and air supply tube 208 are circular in cross-section and are tangentially joined at the outer circumference thereof. In this configuration, supply tubes 204 and 208 may be coextruded from polyvinyl chloride plastics as a single component. Further, it is preferred to design this co-extruded hose so that water supply line 204 can be separated from air supply tube 208 along a parting line P shown in FIG. 5, while still maintaining the continuity and integrity of each supply line.

Referring now to FIG. 5 irrigation control valve 230, is substantially similar to irrigation control valve 130 illustrated in FIGS. 1–3, with the additional feature of providing pneumatic assistance to irrigation control valve 230. The pneumatic assistance is used to facilitate atomization during mist irrigation and provide better dispersion of misted water by creating critical fluid flow through nozzle 243 downstream of the interior port 256. In this embodiment, the components and operation of the irrigation control valve for directing water to the drip port 240 or interior port 256 are identical to the embodiment described above and illustrated in FIGS. 1–2. Accordingly, only the distinctions between the first and second embodiment will be hereafter described.

Cylindrical housing 234 is partitioned into first 250, second 252 and third 260 chamber. Interior wall 246 separates first chamber 250 from second chamber 252 as previously described, while interior wall 254 separates second chamber 252 from third chamber 260. Interior port 256 provides fluid communication from second chamber 252 into third chamber 260. End cap 242 is located at the top of, and closes off cylindrical housing 234. End cap 242 is tapered such that a converging-diverging nozzle 243 extends from third chamber 260 out through mist port 244. Nipple 266 is interposed between air supply tube 208 and cylindrical housing 234 and provides fluid communication between air supply tube 208 and third chamber 260 via inlet passageway 268.

The operation of irrigation system 210 is similar to the operation of the irrigation system 110 described above, with the exception that volumetric air flow may be provided through air supply tube 208 during mist irrigation to facilitate atomization of the water. In this mode, drip valve 270 and mist valve 280 direct water from water supply tube 204 through inlet passageway 264 and port 248 into second chamber 252 as previously described. In addition, air flow is provided from air supply tube 208 through inlet passageway 268 into third chamber 260 where the geometry of converging-diverging nozzle 243 accelerates the air flow to sonic velocities and out of mist port 244. A pressure differential is created between second chamber 252 and third chamber 260 and water communicated to port 256 is drawn into the sonic air flow created by converging/diverging nozzle 243. The acceleration of water flow shears mist into super fine droplets to create a water vapor or fog which is emitted from mist port 244.

FIG. 6 illustrates a third embodiment of irrigation control valve 330 having a single reciprocating piston assembly for selecting drip or mist irrigation. Like reference numerals in the three hundred range are employed to indicate similar components to the previously described embodiments in FIGS. 1–5. Referring to FIG. 6, control valve body 332 has a cylindrical housing 334 having bore 336 along its central longitudinal axis. End cap 338 is positioned to the right of, and closes off cylindrical housing 334. Nipple 362 extends from end cap 338 to couple with water supply tube 304. Passageway 364 provides fluid communication between water supply tube 304 and bore 336. Similarly, end cap 342 is located to the left of, and closes off cylindrical housing 334. Nipple 366 extends from end cap 342 to couple with air supply tube 308 and provide fluid communication between air supply tube 308 and bore 336 via passageway 368.

Orientation fin 320 extends longitudinally along irrigation control valve 330. Arcuate edges 322 and 324 are formed in the left and right portion of orientation fin 320 and engage water supply tube 304 and air supply tube 308 to appropriately position irrigation control valve 330. Flow control passageway 341 is molded into and extends through cylindrical housing 334 and orientation fin 320 in a labyrinthine manner to drip port 340, thus providing fluid communication between bore 336 and drip port 340. Venturi 345 and converging-diverging nozzle 343 extend upwardly from cylindrical housing 334 to provide fluid communication out of irrigation control valve 330.

Piston assembly 370 is responsive to the fluid pressures in water supply tube 304 and air supply tube 308 to direct fluid from bore 336 to drip port 340 or mist port 344 and includes piston 372 disposed within bore 336 having piston head 374, piston skirt 378 and piston bottom 380. Blind bore 375 partially extends through piston 370. Chamber 350 is defined by piston head 374 and blind bore 375, bore 336 and end cap 338. Passageway 364 extends through end cap 338 to provide fluid communication between water supply tube 304 and chamber 350. Chamber 352 is defined by piston bottom 380, bore 336 and end cap 342 and is in fluid communication with passageway 368. Referring to FIG. 6A, piston stop 390 including radially extending ribs 392 is disposed within chamber 352. Passageway 368 extends through end cap 342 and the central portion of radial ribs 392 to provide fluid communication between air supply tube 308 and chamber 352. Piston stop 390 prevents piston assembly 370 from completely reciprocating within bore 336 and engaging end cap 342, thus preventing air flow into left chamber 352. Mist passageway 347 provides fluid communication from bore 336 through control valve body 332 to mist port 344 as can best be seen in FIGS. 6A and 6B.

Referring again to FIGS. 6 and 6B, piston assembly 370 includes piston head seal 382 disposed on piston head 374 and circumscribing blind bore 375, drip passageway seal 384 disposed on piston skirt 378 adjacent piston head 375 and mist passageway seal 386 disposed on piston skirt 378 adjacent piston bottom 380. Piston assembly 370 further includes piston port 376 extending radially through piston 372 from blind bore 375 through piston skirt 378. Piston port 376 provides fluid communication from chamber 350 and blind bore 375 to mist passageway 347.

Figure 6:
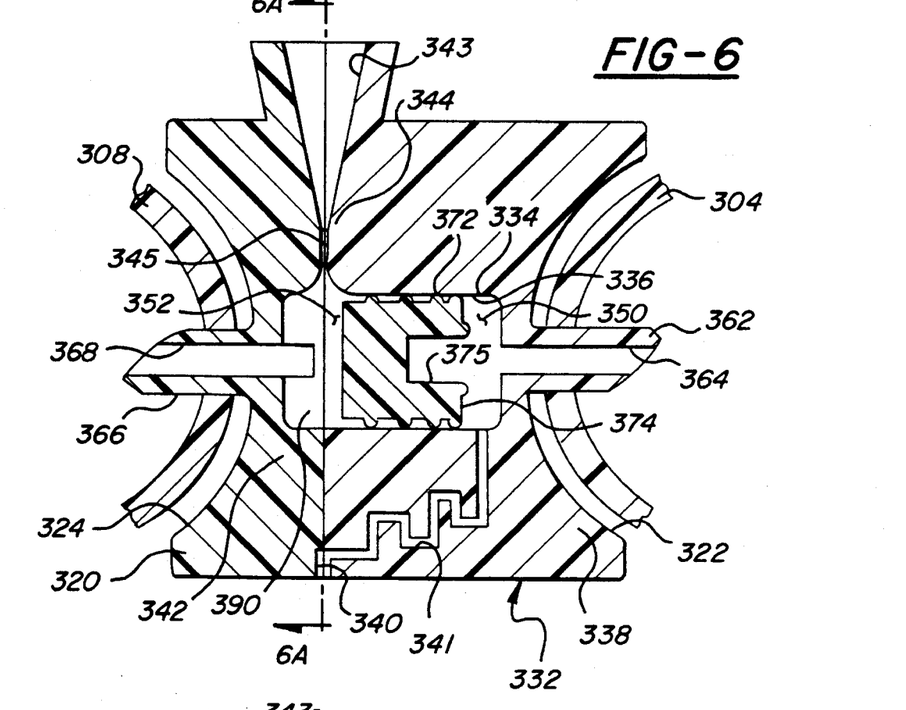
FIG. 6 is a cross-section of a third embodiment of an irrigation control valve of the present invention having water and air supply tubes wherein the displaceable structure is a single reciprocating piston responsive to air pressure for alternately providing mist irrigation and drip irrigation.
Figures 6A, 6B:
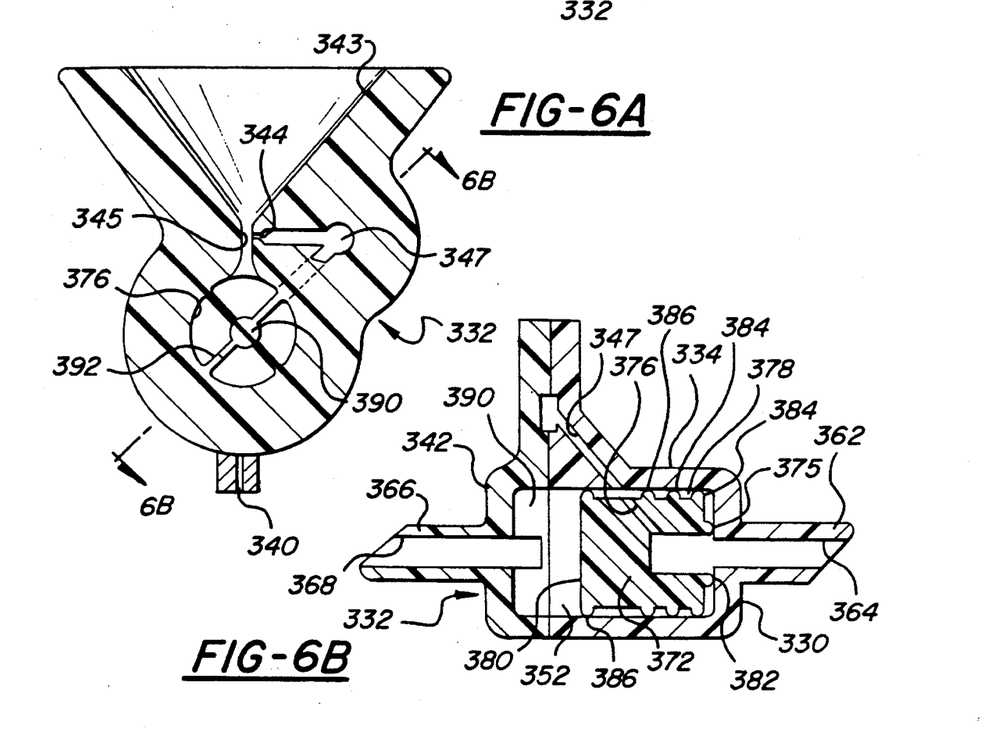
FIG. 6A is a cross-section through the mist port of the irrigation control valve shown in FIG. 6 illustrating the converging-diverging nozzle geometry and air passageways.
FIG. 6B is a cross-section through the control valve body of irrigation control valve shown in FIG. 6 illustrating the internal passageways which provide fluid communication to the mist port.

The operation of irrigation control valve 330 will now be described with particular reference to the structures described above. Piston 372 reciprocates within bore 336 to alternately provide fluid communication from water supply tube 304 to drip port 340 or mist port 344 in response to the fluid pressure in water supply tube 304 and air supply tube 308. During drip irrigation mode water is supplied through water supply tube 304 at a given pressure while no air is supplied through air supply tube 308. Thus, the water from water supply tube 304 is communicated through passageway 364 into chamber 350 and acts upon piston head 374. The resultant force pushes piston 372 leftward until it engages piston stop 390. This displacement reveals flow control passageway 341 and allows fluid communication from chamber 350 through flow control passageway 341 and out through drip port 340. The labyrinthine design of flow control passageway 341 provides flow regulation from chamber 350 to drip port 340 such that a calibrated amount of water is emitted. Water from chamber 350 is also communicated through piston port 376 to piston skirt 378. However, mist passageway seals 386 engage bore 336 to prohibit further flow through piston port 376 during drip irrigation.

When mist irrigation is desired, air supply tube 308 is pressurized causing air flow through passageway 368 and into chamber 352. Air pressure within chamber 352 acts on piston bottom 380 to urge piston 372 rightwardly. As the force acting on piston bottom 380 becomes greater than the force acting on piston head 374, piston 372 is urged rightwardly. When piston 372 reaches its rightwardmost position, piston head seal 382 engages end cap 338, thereby restricting fluid communication in right chamber 350 to blind bore 375. A lower air pressure is now required to maintain mist irrigation as a result of the decreased area of piston head 374 on which the water pressure acts.

Flow control passageway seal 384 conceals drip passageway 341 to prevent fluid communication therethrough. Piston port 376 is now aligned with mist passageway 347 to provide fluid communication from water supply tube 304 to mist port 344 via passageway 364, blind bore 375, piston port 376, and mist passageway 347. In chamber 352, volumetric air flow is provided from air supply tube 308 through venturi 345 into the atmosphere via converging/diverging nozzle 343. Because of the geometry of converging/diverging nozzle 343 and the pressure differential between chamber 352 and the atmosphere, sonic air flow is created at venturi 345. This air flow condition creates a low pressure area in venturi 345 which draws water through mist port 344, shears the water into fine droplets and accelerates the droplets out converging/diverging nozzle 343 at high velocities to create a superfine mist.

FIGS. 7, 7A, 7B and 8 illustrate a fourth embodiment of the present invention which incorporates a displaceable piston-diaphragm assembly for selecting drip or mist irrigation. Irrigation control valve 410 includes control valve body 412 coupled to water supply tube 404 and having drip port 418 therein. Piston-diaphragm assembly 460 is disposed within control valve body 412 to direct fluid flow for mist irrigation or drip irrigation in response to a control signal. Control valve cap 430 covers control valve body 412 and encloses and secures piston-diaphragm assembly 460 within control valve body 412. Control valve cap 430 further includes mist port 440 for providing mist irrigation from irrigation control valve 410 and nipple 426 for providing fluid communication from air supply line 408 through control valve cap 430. In this embodiment, working fluid, i.e. water, is communicated from water supply line 408 into control valve body 412 and is directed to drip port 418 or mist port 440 based on the pressure state of a control fluid, i.e. air, provided in air supply line 408 which biases piston-diaphragm assembly 460. Unlike the previous embodiments of the present invention, air supply line 408 does not require volumetric flow but is only required to hold a pressure which biases piston-diaphragm assembly 460 as further described in detail below.

Figure 7:
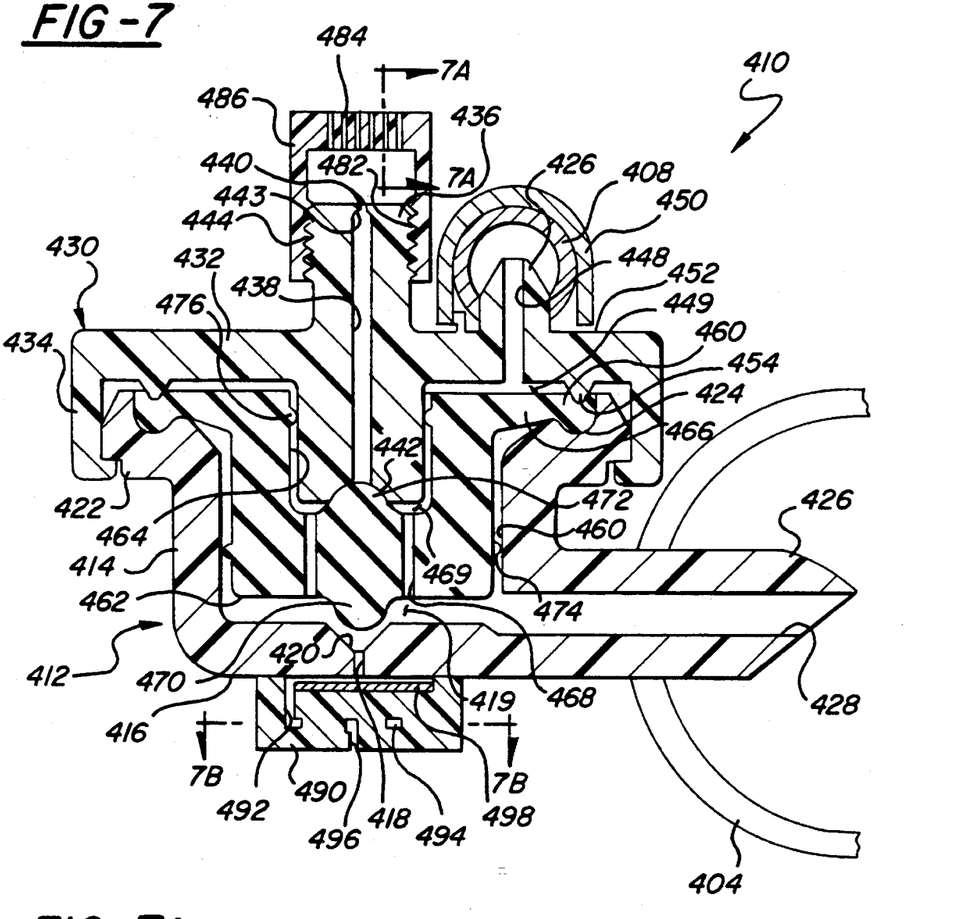
FIG. 7 is a cross-section of a fourth preferred embodiment of an irrigation control valve of the present invention having a water supply tube and a static air pressure control line wherein the displaceable structure is a piston-diaphragm assembly responsive to the static air pressure in the control line.

Referring to FIG. 7, control valve body 412 is generally cup-shaped having cylindrical wall 414 extending upwardly to rim 422. Rim 422 of control valve body 412 has an annular diaphragm retaining channel 424 formed therein. Control valve bottom 416 closes off cylindrical wall 414 to define chamber 415. Control valve bottom 416 has a tapered lower seal seat 420 formed therein which extends downward to drip port 418 for providing fluid communication from chamber 415. Nipple 426 is interdisposed between control valve body 412 and water supply tube 404 and provides fluid communication between water supply tube 404 and chamber 415 via passageway 428.

Control valve cap 430 includes top 432 which substantially covers chamber 415 of control valve body 412. Annular skirt 432 extends downward from top 432 to engage rim 422 and securely position control valve cap 430 on to control valve body 412. Control valve cap 430 further includes diaphragm sealing and retaining rib 454 located on top 432 inboard of annular skirt 434. Nipple 446 extends upwardly through top 432 and pierces air supply tube 408. Control fluid passageway 448 extends through nipple 446 to provide fluid communication from air supply tube 408 into chamber 415. Yoke 450 is pivotally attached at pivot point 452 to top 432 and rotates to engage and securely position air supply tube 408 onto nipple 446. Yoke clip 454 engages and locks yoke 450 in a closed position. Conduit 436 extends through top 432 and includes outlet passageway 438 to provide fluid communication between chamber 415 and mist port 440. Tapered upper seal seat 442 is formed in conduit 436 opposite mist port 440. The upper portion of conduit 436 has external threads 444 to threadedly engage diverter 480.

Figure 7A:
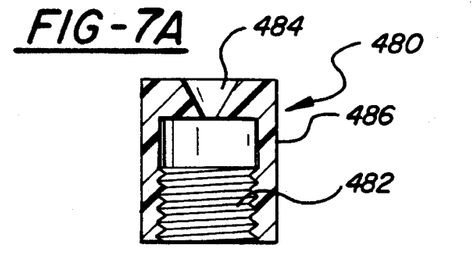
FIG. 7A is a cross-section of the threaded diverter for directing mist emitted from the irrigation control valve shown in FIG. 7.

As illustrated in FIGS. 7 and 7A, diverter 480 includes threaded collar 482 for positioning diverter 480 on control valve cap 430. Diverter uprights 486 extend upwardly from threaded collar 482 and are connected above conduit 436 by triangular member 484. Diverter 480 illustrated in FIG. 7A divides mist emitted from mist port 440 and laterally redirects the mist to the right or left. One skilled in the art would readily recognize that a variety of diverter geometries could be incorporated into diverter 480 to achieve the desired mist irrigation pattern for a given crop or diverter 480 could be molded into irrigation control valve 410, without deviating from the scope of the invention.

Referring again to FIG. 7, piston-diaphragm assembly 460 is disposed within chamber 415 and includes piston 462 having blind bore 464 extending partially therethrough and diaphragm 466 extending outwardly from the upper portion of piston 462. Piston-diaphragm assembly 460 is positioned within control valve body 412 such that the outer portion of diaphragm 466 sits within diaphragm retaining channel 424. Diaphragm retaining rib 454 of control valve cap 430 engages the upper surface of diaphragm 466 and cooperates with diaphragm retaining channel 424 to secure piston-diaphragm assembly 460 within chamber 415. The elastic characteristics of diaphragm 466 acts to bias piston-diaphragm assembly 460 in an upward direction.

Piston-diaphragm assembly 460 divides chamber 415 into drip chamber 419, control fluid chamber 449 and mist chamber 469. Control fluid chamber 449 is defined by control valve cap 430, diaphragm retaining rib 456, diaphragm 466 and conduit 436 such that air from air supply tube 408 is in fluid communication with control fluid chamber 449 via control fluid passageway 448. Mist chamber 469 is defined on three sides by piston 462 and by conduit 436. Outlet passageway 438 provides fluid communication between mist chamber 469 and mist port 440. Drip chamber 419 is defined by control valve body 412 and piston 462. Inlet passageway 428 provides communication between water supply tube 404 and drip chamber 419. Drip port 418 provides fluid communication from drip chamber 419 out of control valve body 412. Diaphragm passageway 468 provides fluid communication between drip chamber 419 and mist chamber 469.

Piston-diaphragm assembly 460 incorporates a plurality of seals to prevent leakage between the air in control fluid chamber 449 and the water in mist chamber 469 and drip chamber 419. In addition, seals are incorporated on piston-diaphragm assembly 460 to expose and conceal drip port 418 and outlet passageway 438. Control valve cap seal 476 is disposed within blind bore 464 to prevent fluid communication between control fluid chamber 449 and mist chamber 469. Similarly, control valve body seal 474 is disposed about the outer surface of piston 462 and seals off drip chamber 419. Drip port seal 470 is disposed on the bottom of piston 462 and capable of engaging lower seal seat 420 to prevent fluid flow through drip port 418 when irrigation control valve 410 is in mist irrigation mode. Mist port seal 472 is disposed within blind bore 464 and capable of engaging upper seal seat 442 to prevent fluid communication from mist chamber 469 into outlet passageway 438 when irrigation control valve 410 is in drip irrigation mode.

Figure 7B:
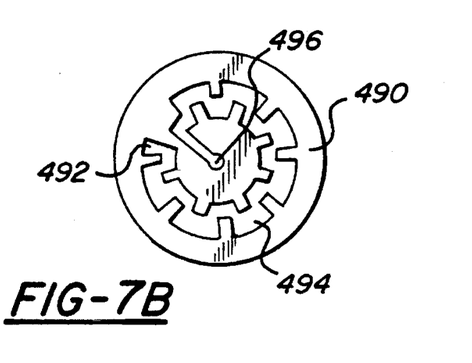
FIG. 7B is a cross-section of a suitable flow regulator utilized on an irrigation control valve to compensate for fluid pressure variations in the water supply line.

Irrigation control valve 410 may also include flow regulator 490 disposed on control valve bottom 416 and in fluid communication with drip port 418. Flow regulator 490 provides a means for regulating the pressure and flow of water. Referring to FIG. 7B, flow regulator 490 includes flow regulator inlet 492 which is in fluid communication with drip port 418. Labyrinthine flow control passageway 494 provides an irregular path for fluid emitted from drip port 418. Flow regulator 490 further includes elastomeric diaphragm 498 which flexes in response to the pressure of the fluid in flow regulator 490 to constrict labyrinthine flow control passageway 494, thereby stabilizing the flow of the fluid in a manner well known in the art. Flow regulator outlet 496 is located at the end of flow control passageway 494 and allows water to be emitted from irrigation control valve 410.

The operation of irrigation control valve 410 will now be described with particular reference to the structures described above. During drip irrigation mode, a volumetric flow of water is provided in water supply tube 404 at a given pressure which communicated into drip chamber 419 via inlet passageway 428. Water which accumulates in drip chamber 419 flows through drip port 418 into flow regulator 490 where it is emitted out flow regulator outlet 496. Water in drip chamber 419 also flow through working fluid passageway 468 into mist chamber 469. However, the force generated by water in drip chamber 419 acting on the bottom of piston 462 urges piston-diaphragm assembly 460 upwardly such that mist port seal 472 engages upper seal seat 442 to prevent fluid communication through outlet passageway 428 and mist port 440.

When mist irrigation from irrigation control valve 410 is desired, air supply tube 408 is pressurized with a non-volumetric flow of air (an air charge) to increase the static pressure in control fluid chamber 449. A sufficient control pressure is applied into control fluid chamber 449 and acts upon diaphragm 466 to overcome the biasing force and the forces acting on the bottom of piston 462 resulting from the water pressure in drip chamber 419. Once this control force overcomes the working fluid force, piston-diaphragm valve 460 displaces downwardly causing drip port seal 470 to engage lower seal seat 420 and conceal drip port 418. Simultaneously, mist port seal 472 exposes outlet passageway 438 allowing water to flow from mist chamber through outlet passageway 438 and to be emitted from mist port 440. The converging nozzle 443 at mist port 440 accelerates the water flowing therethrough to create a fine mist. This mist may impinge on triangular member 484 and be appropriately directed towards the crop.

When drip irrigation is desired from irrigation control valve 410, the static pressure in control supply tube is released causing piston-diaphragm assembly 460 to return to its upwardly biased position. Mist port seal 472 conceals outlet passageway 438 and drip port seal 470 reveals drip port 418 allowing water to drip from control valve body 412.

Figure 8:
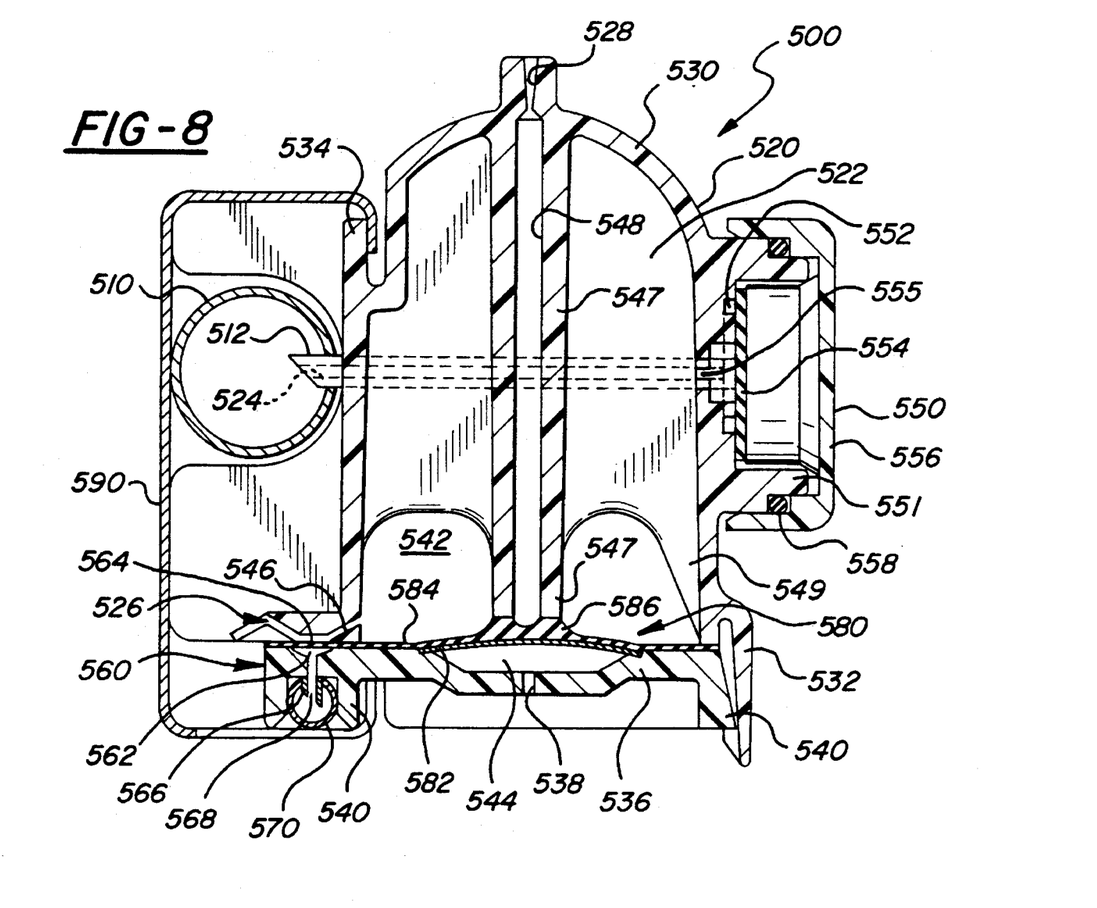
FIG. 8 is a cross-section of a fifth preferred embodiment of an irrigation control valve of the present invention having a water supply tube and a static air pressure control line wherein the displaceable structure is a diaphragm assembly responsive to the static air pressure in the control line, the irrigation control valve further includes a pressure relief valve for intermittently revealing and concealing the mist port to provide pulsating water flow during mist irrigation.
Figure 11:
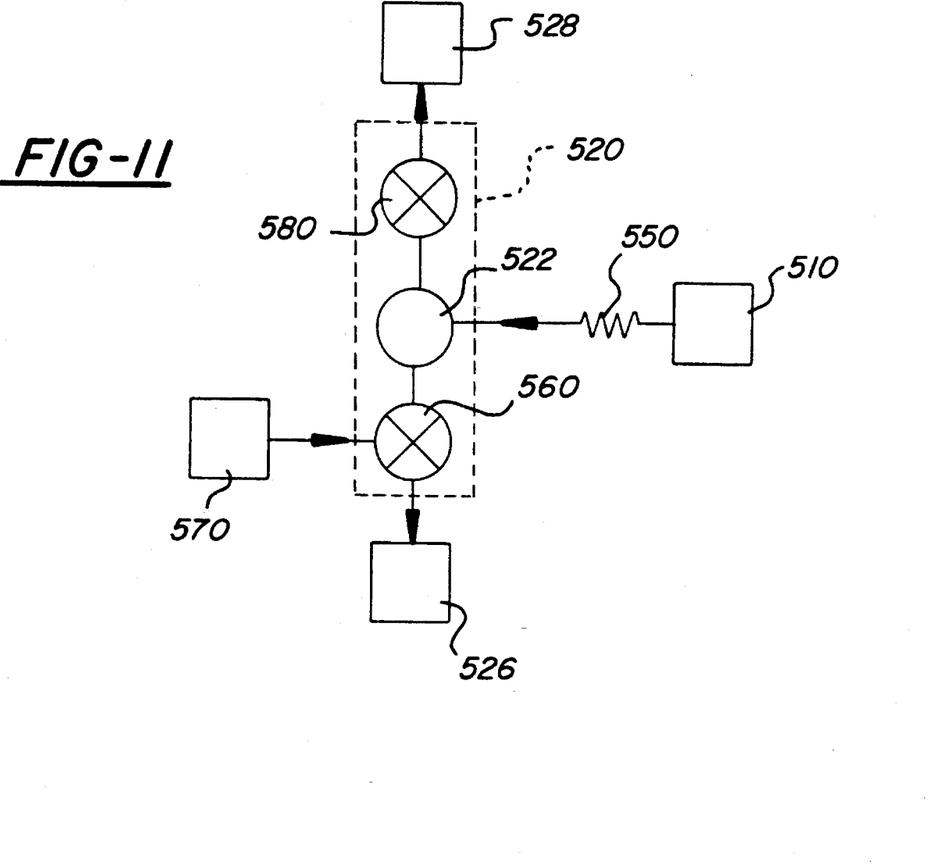
FIG. 11 illustrates the irrigation control valve of FIG. 8 in hydraulic schematic representation.

FIG. 11 schematically represents and FIG. 8 illustrates a fifth embodiment of the present invention wherein water is supplied by water supply tube 510 to irrigation control valve 500 including control valve body 520 for alternately providing drip irrigation from drip port 526 and mist irrigation from mist port 528 in response to a control signal provided by air supply tube 570 which actuates first valve assembly 560 for alternately selecting mist irrigation or drip irrigation. Flow control regulator 550 is interdisposed between water supply tube 510 and control valve body 520 for stabilizing the flow rate of water provided thereto. Control valve body 520 further includes a second valve assembly 580 for intermittently emitting mist when irrigation control valve 500 is in a mist irrigation mode. Thus, in this embodiment, irrigation control valve 500 provides drip irrigation when air supply tube 570 is in a low control state and provides pulsating mist irrigation when air supply tube 570 is in a high control state.

Referring to FIGS. 8 and 11, water supply tube 510 transports water at a given water pressure to irrigation control valve 500. Irrigation control valve 500 includes control valve body 520 having a chamber 522 and a first passageway 524 in fluid communication between water supply tube 510 and chamber 522. Flow regulator 550 is interdisposed between first passageway 524 and chamber 522 for regulating the water flow from water supply tube 510 into chamber 522, and thus controlling and stabilizing the flow rate of the water supply communicated into chamber 522. Control valve body 520 further includes drip port 526 and mist port 528 in fluid communication with chamber 522 for emitting water from irrigation control valve 500 in the appropriate irrigation mode. First valve assembly 560, interdisposed between chamber 522 and drip port 526, enables a user to alternately select the irrigation mode of operation for irrigation control valve 500. First valve assembly 560 is controlled by air supply tube 570 for alternately selecting this mode. Second valve assembly 580, interdisposed between chamber 522 and mist port 528, acts as a pressure relief valve for intermittently emitting a quantity of water through mist port 528 when irrigation control valve 500 is operating in mist irrigation mode.

A working fluid, such as water, is provided to irrigation control valve 500 from a source (not shown) at a given pressure and flow rate to irrigation control valve 500 via water supply tube 510. Nipple 512 extending from control valve body 520 pierces water supply tube 510 to couple irrigation control valve 500 to the working fluid supply source. Water supply tube 510 provides a self-sealing feature which allows a water tight connection to be made between water supply tube 510 and irrigation control valve 500. Passageway 524, molded into control valve body 520, provides fluid communication from water supply tube 510 into chamber 522 via flow regulator 550 as will be discussed further. Bracket 590 cooperates with control valve body 520 to capture and secure water supply tube 510 onto irrigation control valve 500.

Control valve body 520 includes housing 530 having chamber 522 formed therein and base 536 coupled to housing 530 to substantially enclose chamber 522. In the present embodiment latch 532 extends downward from housing 530 to engage tab 540 formed on base 536, thereby securing base 536 to housing 530. In addition, upwardly extending tab 534 formed in housing 530 cooperates with bracket 590 and downwardly extending tab 540 formed in base 536 to further secure base 536 to housing 530. While the present embodiment illustrates the use of tabs and brackets to secure housing 530 to base 536, any means of fastening these components may be incorporated herein without deviating from the scope of the invention.

Second valve assembly 580, disposed within chamber 522, divides chamber 522 into accumulation chamber 542 and vented chamber 544. Accumulation chamber 542 is in fluid communication with water supply tube 510, drip port 526 and mist port 528 as heretofore described. Vent port 538 formed in base 536 is in fluid communication with vented chamber 544 to provide a chamber having substantially atmospheric pressure.

As previously identified, flow regulator 550 is interdisposed between first passageway 524 and accumulation chamber 542 to provide pressure compensating flow control of the water flow rate into accumulation chamber 542. In the present embodiment, annular wall 551 is formed within and extends from control valve body 520. In addition, a labyrinthine channel 552 is formed in the outer wall of housing 530 and has a first end in fluid communication with first passageway 524 and a second end in fluid communication with accumulation chamber 542. This configuration of a flow regulator is illustrated and further described above in reference to FIG. 7B. A flexible membrane 554 substantially covers and engages labyrinthine channel 552 such that labyrinthine channel 552 and membrane 554 defines a flow regulating passageway 555 having a first end in fluid communication with first passageway 524 and a second end in fluid communication with accumulation chamber 542. Cap 556 engages annular wall 551 and urges flexible membrane 554 onto labyrinthine channel 552. Seal 558 surrounds annular wall 551 and provides a water tight seal between cap 556 and annular wall 551. In the present embodiment, cap 556 and membrane 554 are removably positionable onto housing 530 so that these components may be disassembled and flow regulator 550 periodically cleaned of debris which may be transported through water supply tube 510.

In operation, water transported into flow regulator 550 may have a significant variation in water pressure. As this water pressure increases and decreases, membrane 554 flexes to expand or constrict flow regulating passageways 555 such that a substantially stable flow rate and water pressure is provided into accumulation chamber 542 in a manner well known in the art. While the present embodiment is particularly described and illustrated with a flow regulator having a labyrinthine channel, one skilled in the art would readily recognize that any flow regulating device which provides a substantially stable water pressure to accumulation chamber 542 could be incorporated into the present invention without deviating from the scope of the present invention.

Drip passageway 546 is formed in housing 530 to provide fluid communication between accumulation chamber 542 and drip port 526. As will be described in further detail below, first valve assembly 560 is interdisposed between accumulation chamber 542 and drip port 526 for alternately selecting drip irrigation mode or mist irrigation mode. Housing 530 further includes internal conduit 547 disposed within accumulation chamber 542 along the longitudinal axis of control valve body 520. A plurality of ribs 549 extend radially from internal conduit 547 to the surface of accumulation chamber 542 to position and support internal conduit 547. Mist passageway 548 extends through internal conduit 547 and provides fluid communication between accumulation chamber 542 and mist port 528. As will be described in further detail, second valve assembly 580 is disposed in the bottom of accumulation chamber 542 and cooperates with internal accumulation conduit 547 for alternately providing fluid communication between accumulation chamber 542 and mist port 528.

In the present embodiment, first valve assembly 560 is a pressure activated valve which selectively opens or closes drip passageway 546 in response to a control signal provided by air supply tube 570. Valve diaphragm 564 is interdisposed between housing 530 and base 536, such that valve diaphragm 564 intersects drip passageway 546. Base 536 includes nipple 566 extending downward to pierce air supply tube 570 and has passageway 568 passing therethrough to provide fluid communication between air supply tube 570 and valve chamber 562 formed in base 536. Downwardly extending tab 540 formed on base 536 captures and positively positions air supply tube 570. Bracket 590 engages tab 540 and air supply tube 570 to maintain fluid coupling between air supply tube 570 and irrigation control valve 500 in a manner similar to water supply tube 510.

In the preferred embodiment, bracket 590 may also be used to mount irrigation control valve 500 in its appropriate environment. Thus, a bracket similar to that illustrated and described in reference to FIGS. 4 and 5 would provide a presently preferred means for securing water supply tube 510, air supply tube 570 and irrigation control valve 500. By combining the mounting functions and the securing functions into a single bracket, a mounting system is provided which allows for an effective means of aligning and targeting the mist irrigation and drip irrigation which is insensitive to impact from other agricultural operations which are performed in the fields.

In operation, first valve assembly 560 utilizes a static pressure provided in air supply tube 570 to urge valve diaphragm 564 upwardly, thus closing drip passageway 546 and preventing fluid communication from accumulation chamber 542 to drip port 526. While the present embodiment described a pressure actuated valve for selectively opening or closing drip passageway 546 one skilled in the art would readily recognize that any valve assembly capable of opening or closing drip passageway 546 in response to a control signal would effectively function in the present invention. For example, an electrically activated valve could be substituted for valve assembly 560 and an electrical signal could be substituted for the static air pressure control signal described above.

Figure 10:
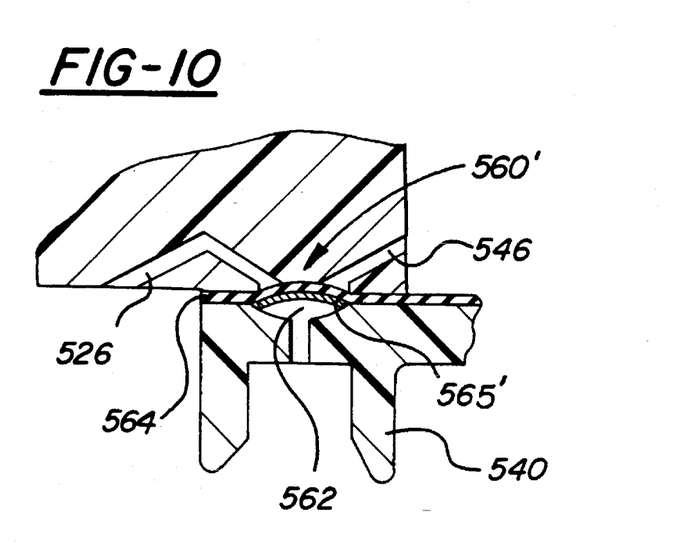
FIG. 10 is a cross-section of the diaphragm assembly of the irrigation control valve shown in FIG. 8 illustrating an alternate embodiment incorporating a bi-metallic disc spring member which is responsive to the ambient temperature for alternatively providing drip irrigation and mist irrigation.

Alternatively, a thermally activated valve assembly could be substituted for valve diaphragm 564 such that drip passageway 546 would be closed when the ambient temperature surrounding irrigation control valve 500 decreased below a predetermined value such that mist irrigation would automatically provide frost protection when the ambient temperature reached a critical temperature. As illustrated in FIG. 10, bi-metallic disc 565' positioned within first valve assembly 560' under diaphragm 564 such that at ambient temperatures substantially above 32° F., diaphragm 564 and disc 565' are concave-shaped and allow fluid communication from accumulation chamber 542 to drip port 526. When the ambient temperature approaches 32° F., bi-metallic disc 565' deflects to a convex shape as a result of the difference in coefficient of thermal expansion of the two materials. In this position, diaphragm 564 seals off drip passageway 546' in a manner similar to that described above.

As previously described, second valve assembly 580 provides a pressure relief valve between accumulation chamber 542 and mist port 528 to generate a pulsating or intermittently emitting mist irrigation. In the present embodiment, second valve assembly 580 includes disc spring member 582 secured within base 536 and valve diaphragm 584 overlaying disc spring member 582 and being captured between housing 530 and base 536. While in the present embodiment, valve diaphragm 564 and 584 are a single unitary piece, one skilled in the art would readily recognize that these diaphragms could be separate components. In its normal or undeformed state disc spring member 582 maintains a convex shape such that valve diaphragm 584 sealably engages internal conduit 547 thereby preventing fluid communication between accumulation chamber 542 and mist passageway 548. As pressure builds in accumulation chamber 542 the force acting on disc spring member 582 increases to a point greater than the spring constant of disc spring member 582. When this occurs disc spring member 582 displaces downwardly and takes on a concave shape, thus revealing mist passageway 548 and allowing water to be communicated from accumulation chamber 542 to mist port 528. The release of water from accumulation chamber 542 causes a pressure drop therein and decreases the load acting on disc spring member 582. When this force decreases below a reset value, disc spring member 582 displaces back into its original convex shape and diaphragm 584 conceals mist passageway 548 again.

While various methods of manufacture and materials may be used to fabricate disc spring member 582, it is presently preferred that a stamped stainless steel disc be used in this application. Furthermore, the design of disc spring member 582 should be such that the load at which disc spring member 582 displaces from a convex shape to a concave shape, the trip load, is greater than the load at which disc spring member 582 displaces from the concave shape back to the convex shape, the reset load. By incorporating a step between the trip load and reset load, disc spring member 582 provides a dwell time necessary for evacuation of a calibrated amount of water through mist passageway 548 and out mist port 528.

Figure 9:
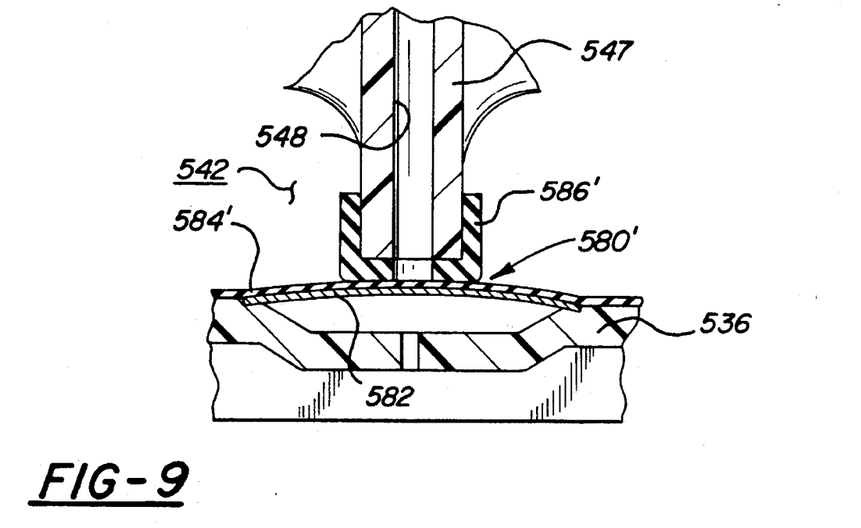
FIG. 9 is a cross-section of the pressure relief valve of the irrigation control valve shown in FIG. 8 illustrating an annular seal disposed on the control valve body rather than molded into the diaphragm of the pressure relief valve.

In the present embodiment, valve diaphragm 584 includes raised annular portion 586 for engaging and sealing internal conduit 547. Raised annular portion 586 may be formed into valve diaphragm 584 or may include a separate seal which engages internal conduit 547. Raised annular portion 586 accommodates small linear displacements of disc spring member 582 while the pressure builds in accumulation chamber 542 and maintain the seal between valve diaphragm 584 and internal conduit 547. Referring now to FIG. 9, an alternate means of sealing internal conduit 547 can be achieved by disposing elastomeric cap 586' on internal conduit 547. Cap 586' has sufficient compliance to accommodate the small linear displacement of disc spring member 582 while maintaining the water tight seal with valve diaphragm 564' between accumulation chamber 542 and internal conduit 547.

While second valve assembly 580 in the present embodiment has been described as a disc spring member/valve diaphragm assembly, one skilled in the art would readily appreciate that any valve assembly which alternatively provides fluid communication between accumulation chamber 542 and mist port 528 in response to the pressure present in accumulation chamber 542 could be incorporated into the present invention without deviating from the scope thereof.

Furthermore, in the present embodiment, irrigation control valve 500 includes control valve body 520 having a single drip port 526 and a single mist port 528 as a unit. However, the present invention is adaptable to provide multiple drip ports 526 and/or mist ports 528 in fluid communication with a single control valve body 526. In this embodiment, individual outlet tubes would branch off of drip port 526 and mist port 528 to provide a plurality of drip ports and mist ports which could be appropriately positioned and targeted by bracket 590. This would minimize the cost of the irrigation system by reducing the number of control valves used.

The operation of irrigation control valve 500 will now be described with particular reference to the structures described above. In typical drip mode operation water from supply line 510 is transported through first passageway 524 into flow regulator 550 which substantially stabilizes the water flow rate provided to irrigation control valve 500. An atmospheric or low pressure signal is provided in air supply tube 570, thus establishing fluid communication from accumulation chamber 542 to drip port 526 via drip passageway 546. Water which accumulates in accumulation chamber 542 at a desired flow rate dictated by the design of flow regulator 550 is transported through drip passageway 546 and is emitted from drip port 526 at a calibrated drip rate.

To operate irrigation control valve 500 in a pulsating mist irrigation mode, an increased or high static pressure change is provided in air supply tube 570 by any of a variety of means including a hand bicycle pump, a small compressor, an air tank or any similar device. This control signal is communicated through passageway 568 into valve chamber 562 where it acts on valve diaphragm 564. Valve diaphragm 564 is displaced into and substantially closes off drip passageway 546, thus preventing water emission from drip port 526 and allowing water to accumulate in accumulation chamber 542.

Accumulation chamber 542 contains a dead-headed air volume and as water flows through flow regulator 550 and into accumulation chamber 542, it compresses the resident air and builds pressure until the pressure in accumulation chamber 542 reaches the trip pressure of second valve assembly 580. When the trip pressure is reached in accumulation chamber 542, disc spring member 582 displaces from its convex shape to its concave shape, thus revealing mist passageway 548 and allowing water under pressure to be emitted from accumulation chamber 542 and out of mist port 528. As the air residual in chamber 542 expands, the water is pushed out through mist port 528 and emitted from irrigation control valve 500, and the pressure in accumulation chamber 542 drops until the reset pressure of disc spring member 582 is reached. When this reset pressure is reached, disc spring member 582 displaces back from its concave shape to its convex shape, thus concealing mist passageway 548 and allowing pressure in accumulation chamber 542 to build again and the pulse cycle is repeated.

In operation, second valve assembly 580 remains open for a dwell time to allow water in accumulation chamber 542 to be emitted from irrigation control valve 500. Variables which affect the dwell time and amount of water ejected from irrigation control valve 500 in mist irrigation mode include the trip pressure and reset pressure of disc spring member 582, the volume of accumulation chamber 542 and the sizing of mist passageway 548 and mist port 528.

From the foregoing, those skilled in the art should realize that the present invention provides an irrigation control valve having a displaceable structure disposed within a control valve body and responsive to fluid pressure for alternately directing fluid to a drip port or a mist port. Although the invention has been described with particular reference to a number of preferred embodiments, variations and modifications can be effected within the spirit and scope of the following claims.

I claim:

1. An irrigation control valve in an irrigation system comprising:

at least one tube supplying a liquid at a pressure;

a control valve body having an inlet port coupled to said at least one tube and in fluid communication with said liquid therein, a first end portion having a drip port provided therein for providing drip irrigation and a second end portion having a mist port provided therein for providing mist irrigation; and a displaceable structure disposed within said control valve body and responsive to a remotely-generated control signal;

whereby the irrigation control valve alternately provides drip irrigation when said control signal is in a first control state and mist irrigation when said control signal is in a second control state.

2. The irrigation control valve of claim 1 wherein said at least one tube comprises a water tube supplying water at a water pressure.

3. The irrigation control valve of claim 1 wherein said first portion is located at a top portion of said control valve body and said second portion is located at a bottom portion of said control valve body.

4. The irrigation control valve of claim 3 wherein said control valve body further comprises a center portion interconnecting said top and bottom portions to define a chamber having said displaceable structure disposed therein, said inlet port providing fluid communication between said at least one tube and said chamber.

5. The irrigation control valve of claim 4 wherein said displaceable structure is interdisposed between said chamber and said drip port for alternately providing drip irrigation and mist irrigation.

6. The irrigation control valve of claim 1 further comprising a bracket capturing and positively positioning said at least one tube in relation to said control valve body.

7. An irrigation control valve for an irrigation system having a working fluid supply tube for supplying a working fluid to the irrigation control valve at a predetermined pressure, the irrigation control valve comprising:

a control valve body having a chamber, a first passageway for providing fluid communication between the working fluid supply tube and said chamber, a drip port and a mist port, said drip port and said mist port being in fluid communication with said chamber;

a first valve assembly interdisposed between said chamber and said drip port for controlling fluid communication between said chamber and said drip port, said first valve assembly being responsive to a control signal; and a second valve assembly interdisposed between said chamber and said mist port for controlling fluid communication between said chamber and said mist port, said second valve assembly being responsive to fluid pressure in said chamber.

8. The irrigation control valve of claim 7 wherein said second valve assembly intermittently provides fluid communication between said chamber and said mist port.

9. The irrigation control valve of claim 7 wherein said second valve assembly comprises a pressure relief valve being responsive to the fluid pressure in said chamber for intermittently providing fluid communication between said chamber and said mist port.

10. The irrigation control valve of claim 7 wherein said second valve assembly is positionable to a closed position to prevent fluid communication from said chamber to said mist port when the fluid pressure in said chamber is less than a predetermined pressure, and wherein said second valve assembly is positionable to an open position to enable fluid communication from said chamber to said mist port when the fluid pressure in said chamber is at least equal to said predetermined pressure.

11. The irrigation control valve of claim 12 wherein said second valve assembly provides a dwell between when said second valve assembly is positioned from said open position and when said second valve assembly returns to said closed position.

12. The irrigation control valve of claim 7 wherein the control valve body comprises a housing and a base and wherein said second valve assembly comprises a spring member disposed within said base and a diaphragm overlaying said spring member and disposed between said housing and said base for sealably engaging said mist port.

13. The irrigation control valve of claim 12 wherein said spring member comprises a disc spring member which flexes from a convex shape in said closed position to a concave shape in said open position.

14. The irrigation control valve of claim 7, wherein said first valve assembly comprises a diaphragm postionable from a first position wherein fluid communication is provided between said chamber and said drip port to a second position wherein fluid communication is prevented between said chamber and said drip port.

15. The irrigation control valve of claim 14, wherein said first valve assembly further comprises a thermostatic member responsive to an ambient temperature surrounding said control valve for positioning said diaphragm.

16. The irrigation control valve of claim 14, wherein irrigation control valve further comprises signal means for proving a control signal to said first valve assembly, said signal means being coupled to and in communication with said first valve assembly.

17. The irrigation control valve of claim 16, wherein said signal means comprises:

a signal fluid supply tube for supplying a signal fluid at a signal fluid pressure; and a signal fluid inlet port for providing fluid communication between said signal fluid supply tube and said diaphragm, said diaphragm being positionable in response to said signal fluid pressure.

18. The irrigation control valve of claim 17 further comprising a bracket capturing and positively positioning the working fluid supply tube and said signal fluid supply tube in relation to said control valve body.

19. The irrigation control valve of claim 7 further comprises a flow regulator having:

a labyrinthine channel formed in said control valve body, said labyrinthine channel having a first end in fluid communication with said first passageway and a second end in fluid communication with said chamber;

a flexible membrane covering and engaging said labyrinthine channel; and a cap urging said flexible membrane adjacent to said labyrinthine channel;

wherein said flexible membrane and said cap are removably positionable onto said control valve body.

20. The irrigation control valve of claim 7 further comprising a bracket capturing and positively positioning the working fluid supply tube in relation to said control valve body.

21. An irrigation control valve for an irrigation system having a working fluid supply tube for supplying a working fluid to the irrigation control valve at a predetermined pressure, the irrigation control valve comprising:

a control valve body including a top portion having a mist port provided therein, a bottom portion opposite said top portion and having a drip port provided therein, a center portion interconnecting said top and bottom portions to define a chamber, and a first passageway for providihg fluid communication between the working fluid supply tube and said chamber, said mist port and said drip port being in fluid communication with said chamber; and a valve assembly interdisposed between said chamber and at least one of said drip port and said mist port for selectively controlling fluid communication from said chamber to said drip port and to said mist port, said valve assembly being responsive to a selectively applied fluid control signal.

22. The irrigation control valve of claim 21 wherein said valve assembly comprises a first valve assembly interdisposed between said chamber and said drip port for controlling fluid communication therebetween.

23. The irrigation control valve of claim 22 wherein said valve assembly further comprises a pressure relief valve being responsive to the fluid pressure in said chamber for intermittently providing fluid communication between said chamber and said mist port.

24. The irrigation control valve of claim 23 wherein said valve assembly is positionable to a closed position to prevent fluid communication from said chamber to said mist port when the fluid pressure in said chamber is less than a predetermined pressure, and wherein said valve assembly is positionable to an open position to enable fluid communication from said chamber to said mist port when the fluid pressure in said chamber is at least equal to said predetermined pressure.

25. The irrigation control valve of claim 24 wherein said valve assembly provides a dwell between when said valve assembly is positioned from said open position and when said valve assembly returns to said closed position.

26. An irrigation control valve for an irrigation system, the irrigation control valve comprising:

a water supply tube for supplying a volumetric flow of water;

an air supply tube for providing an air pressure control signal;

a control valve body including
a housing and a base, said housing and said base defining an enclosed chamber,
a first passageway for providing fluid communication from said water supply tube to said chamber,
a drip port formed in said control valve body and in fluid communication with said chamber, and
a mist port formed in said control valve body and in fluid communication with said chamber;

a flow regulator interdisposed between said water supply tube and said chamber for providing water to said chamber at a predetermined flow rate;

a first valve assembly including a first diaphragm member interdisposed between said chamber and said drip port, said first valve assembly being in fluid communication with said air supply tube for controlling fluid communication between said chamber and said drip port in response to said air pressure control signal; and a second valve assembly including a disc spring member and a second diaphragm member interdisposed between said chamber and said mist port, said second valve assembly being responsive to fluid pressure within said chamber for intermittently providing fluid communication between said chamber and said mist port.

27. An irrigation control valve for an irrigation system having a water supply tube for supplying water to intermittently emit the water in a mist, the irrigation control valve comprising:

a control valve body having a housing and a base attached to a bottom portion of said housing, a chamber defined by said housing and said base, an inlet passageway for providing a substantially constant flow of water to said chamber from the water supply tube, a mist port formed in a top portion of said control valve body, and a conduit disposed within said chamber and having a first end adjacent said base and a second end terminating at said mist port for providing fluid communication between said chamber and said mist port;

a valve assembly disposed within said chamber between said base and said first end of said conduit, said valve assembly including a spring structure displaceable between a convex position to conceal said first end of said conduit and a concave position to reveal said first end of said conduit;

said spring structure being arranged to maintain said convex position when pressure in said chamber is less than a trip pressure, and to be displaceable from said convex position to said concave position when pressure in said chamber is at least equal to said trip pressure; and said spring structure being arranged to maintain said concave position when pressure in said chamber is at least equal to a reset pressure, and to be displaceable from said concave position to said convex position when pressure in said chamber is less than said reset pressure.

28. The irrigation control valve of claim 27 wherein said control valve body further comprises a generally cylindrical housing having a top portion opposite said base, said conduit longitudinally extending from said top portion into said chamber, said conduit being supported by a rib extending from said cylindrical housing to said conduit.

29. The irrigation control valve of claim 28 wherein said conduit extends downward along a central longitudinal axis of said chamber and said spring structure is concentrically disposed within a bottom portion of said chamber and defines an accumulation chamber above said spring structure and a vent chamber below said spring structure.

30. The irrigation control valve of claim 29 wherein said valve assembly further comprises said spring structure including a disc spring and a resilient diaphragm interdisposed between said disc spring and said conduit.

31. The irrigation control valve of claim 30 wherein said diaphragm includes an annular seal to compensate for small linear displacements of said spring structure in said convex position for maintaining sealing engagement of said valve assembly with said conduit.

32. The irrigation control valve of claim 27 wherein in said inlet passageway further comprises a pressure compensated flow regulator integrally formed in said housing and interdisposed between the water supply tube and said chamber.

33. The irrigation control valve of claim 32 wherein said pressure compensated flow regulator comprises a labyrinthine flow control passageway and an elastomeric diaphragm for providing said substantially constant flow of water to said chamber.

\* \* \* \* \*